United States Patent [19]

Agarwal

[11] Patent Number: 5,770,894
[45] Date of Patent: Jun. 23, 1998

[54] PARALLEL PROCESSING METHOD HAVING ARITHMETICAL CONDITIONS CODE BASED INSTRUCTIONS SUBSTITUTED FOR CONVENTIONAL BRANCHES

[75] Inventor: Ramesh Chandra Agarwal, Yorktown Heights, N.Y.

[73] Assignee: International Business Machines Corporation, Armonk, N.Y.

[21] Appl. No.: 678,008

[22] Filed: Jul. 10, 1996

[51] Int. Cl.$^6$ ..................................................... G06F 9/45
[52] U.S. Cl. ...................... 395/706; 395/708; 395/562; 395/581; 395/800.23; 395/391
[58] Field of Search ................................. 395/706, 708, 395/568, 581, 562, 391, 800.23

[56] References Cited

U.S. PATENT DOCUMENTS

5,471,593  11/1995  Branigin ................................. 395/24
5,596,732  1/1997  Hosoi ..................................... 395/709

*Primary Examiner*—Kenneth S. Kim
*Attorney, Agent, or Firm*—Whitham, Curtis & Whitham; Stephen C. Kaufman

[57] ABSTRACT

A computer implemented method performed by a processor having multiple functional units avoids branches in decision support codes by doing arithmetic instructions incorporating condition codes generated by compare instructions. The method comprising the steps of analyzing operations in code to be performed by said processors to identify branch operations, substituting for identified branch operations arithmetic condition codes, decoding and dispatching multiple instructions in one processor cycle, and executing multiple functions in parallel per cycle using each of the functional units of said processor.

15 Claims, 7 Drawing Sheets

PARALLEL PROCESSING METHOD HAVING ARITHMETICAL CONDITIONS CODE BASED INSTRUCTIONS SUBSTITUTED FOR CONVENTIONAL BRANCHES

BACKGROUND OF THE INVENTION

1. Field of the Invention

The present invention generally relates to general purpose data processing methods and apparatus and, more particularly, to a technique for avoiding branches in decision support system (DSS) codes by doing arithmetic with condition codes thereby making possible parallel and pipeline processing afforded by multi functional unit processors, such as reduced instruction set computers (RISC) and very long instruction word (VLIW) processors.

2. Background Description

In commercial decision support systems (DSS), a large fraction of computational time is spent in sorting, hashing, searching, and scanning operations. These computational steps are generally implemented using compare and branch instructions. In these computations, the outcome of the comparison is used to branch to different segments of the code. In older computers, this was not a major performance concern, because each instruction was executed sequentially. Modern high performance computers are heavily pipelined. They can decode and dispatch multiple instructions in one cycle. They also contain multiple functional units working in parallel. In such a situation, the highest level of performance can be obtained only if the instructions to be executed are known several cycles in advance. On machines executing multiple instructions per cycle, this often translates into dozens of instructions. On these machines, compare and branch instruction sequences result in a control flow interruption and thus create a performance bottleneck. To achieve the highest level of performance, the code should not have any conditional branch instructions; in other words, it must be a "straight line" code. Additionally, it is important that multiple independent instruction streams be executed in parallel to fully utilize multiple functional units. Most engineering/scientific codes satisfy these requirements by unrolling the loop, so as to create multiple independent instruction streams. Unfortunately, such unrolling is usually not possible in commercial codes such as sorting/searching, because of the conditional branches. These codes have not been able to effectively utilize the multiple functional units present on modern high performance reduced instruction set computers (RISC), such as the PowerPC® microprocessor. This problem will get worse in the next generation of processors which are likely to be very long instruction word (VLIW) processors with a very large number of functional units.

SUMMARY OF THE INVENTION

It is therefore an object of the present invention to provide a method and a system to avoid most of the conditional branches in the above operations.

According to the invention, a computer implemented method performed by a processor having multiple functional units avoids branches in decision support codes by doing arithmetic instructions incorporating condition codes generated by compare instructions. The method comprising the steps of analyzing operations in code to be performed by said processors to identify branch operations, substituting for identified branch operations arithmetic condition codes, decoding and dispatching multiple instructions in one processor cycle, and executing multiple functions in parallel per cycle using each of the functional units of said processor.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
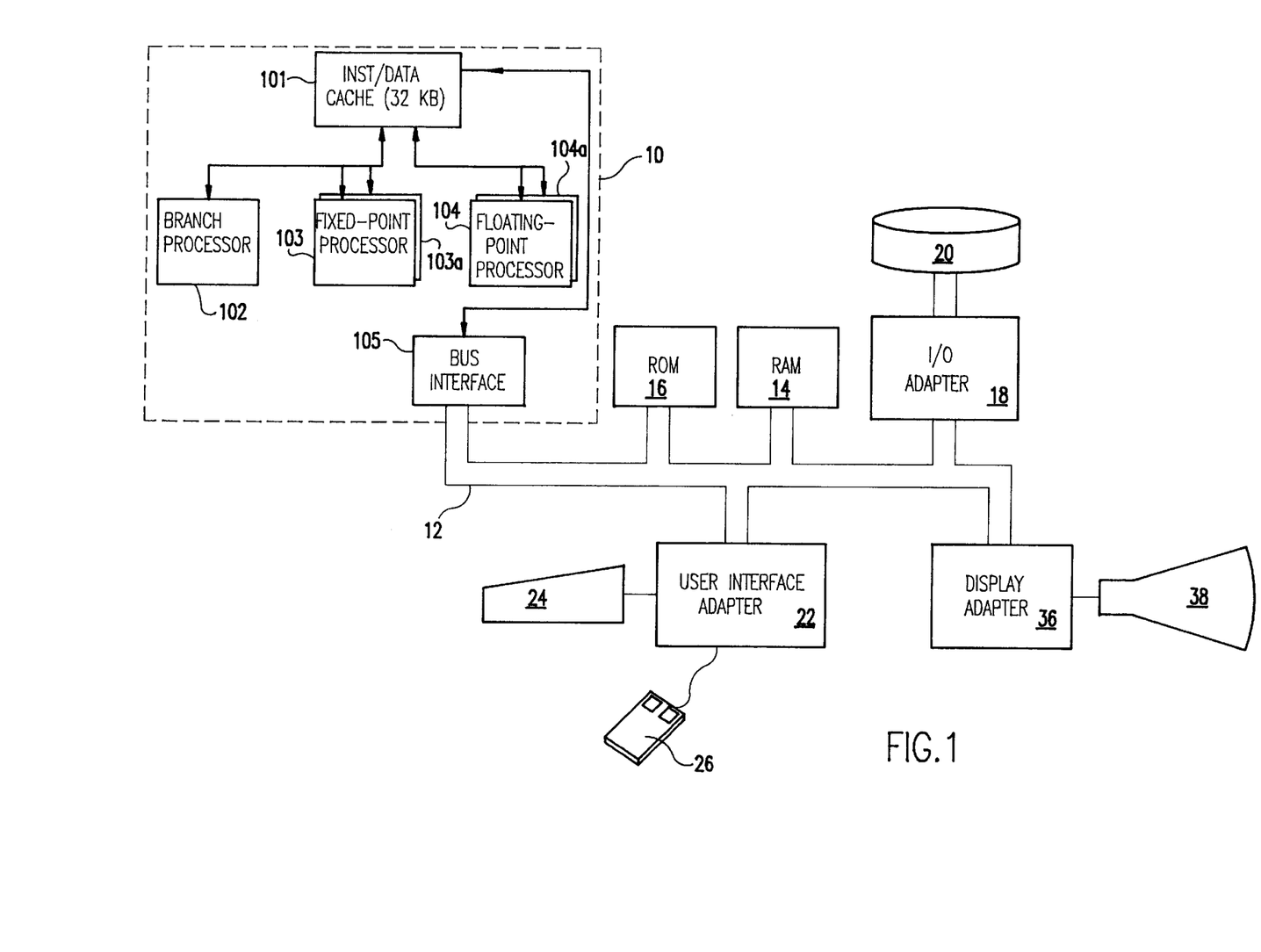
FIG. 1 is a block diagram of an illustrative processor on which the invention may be implemented.

Referring now to the drawings, and more particularly to FIG. 1, there is shown a representative hardware environment on which the subject invention may be implemented. This hardware environment may be a workstation such as IBM's RS/6000 Workstations as described, for example, by Jim Hoskins, *IBM RISC System/6000*, 5th Ed. John Wiley & Sons, Inc. (1995). The hardware includes a central processing unit (CPU) 10, which may be a RISC microprocessor such as IBM's PowerPC™ microprocessor as described in *The PowerPC™ Architecture: A Specification for a New Family of RISC Processors*, edited by Cathy May, Ed Silha, Rick Simpson and Hank Warren, Morgan Kaufmann Publishers (1994). In one example, the PowerPC® 601 architecture is used in the RISC System/6000 Model 250 workstation. The instruction and data caches are combined as a single cache 101. The branch processor 102 executes only branch instructions from cache 101. The CPU 10 additionally has a branch processor 102, and multiple functional arithmetic units. The multiple functional units include fixed-point processors or integer units (FXU) 103 and 103a and floating-point processors or units (FPU) 104 and 104a which execute instructions on data supplied by cache 101. The cache 101 communicates with the bus interface 105.

The CPU 10 is attached to a system bus 12 to which are attached a random access memory (RAM) 14, a read only memory (ROM) 16, an input/output (I/O) adapter 18, and a user interface adapter 22. The RAM 14 functions as main memory to the CPU 10 and provides temporary storage for application program code and data, while ROM 16 typically includes the basic input/output system (BIOS) code and may be implemented with flash, or electronically programmable, memory. The I/O adapter 18, such as a SCSI (for small computer system interface) adapter, is connected to one or more Direct Access Storage Devices (DASDs), here represented as a disk drive 20. The disk drive 20 typically stores the computer's operating system (OS), such as IBM's AIX™ operating system, and various application programs, each of which are selectively loaded into RAM 14 via the system bus 12. The user interface adapter 22 has attached to it a keyboard 24, a mouse 26, and/or other user interface devices such as a touch screen device (not shown). Such touch screen device would optionally be installed on the display 38, here represented as a cathode ray tube (CRT) display but which may be a liquid crystal display (LCD) or other suitable display device. The display 38 is connected to the system bus 12 via a display adapter 34.

The conditional operations are usually represented by "IF THEN ELSE" clause. Depending on the outcome of the condition, the code executes different operations. However, if the two different operations are reformulated to incorporate the outcome of the condition in such a way that they appear to be the same operation, then the conditional clause can be eliminated and unconditional operations (incorporating the outcome of the condition can be executed. As an example, consider the implementation of the max function. Let c=max(a,b). In Fortran, this is implemented as shown below.

If (a.ge.b) then $$c=a$$

else $$c=b$$

endif

If we were to define a select function, which on the basis of a condition code selects from two operands, then the code above can be implemented without any branches.

Select

The select function is defined as c=select(cc,a,b), where cc is a binary condition code. If cc=1, then c=a, else c=b. The implementation of the select function in hardware is straight forward as described in more detail below. Depending on the cc bit, the value of c is set to one or the other operand. In a RISC implementation, a, b and c denote registers and cc is a condition code bit. Alternatively, stored logical variables can also be used in lieu of the condition code bit. Most RISC machines provide for several condition code bits. Depending on the number of condition code bits available, an appropriate number of bits (in the instruction format) must be provided to specify the cc operand. Fortran (and other high level languages) provide logical variables which can be internally (in hardware) translated into condition code bits. Thus, the above function can be implemented as shown below.

$$cc=(a.ge.b)$$

$$\ldots$$

$$\ldots$$

$$c=select(cc,a,b)$$

Note that to avoid delay due to pipeline latency, it is preferable to set the condition code several cycles in advance. The select instruction is straightforward in hardware. It consists of a multiplexer (MUX) which chooses one of the two operands depending on the condition code bit (cc). The important thing about this implementation is that there are no branches. The hardware does not know which way the branch will take place. Branches also create a problem in unrolling the code. In the presence of branches, it is very difficult to unroll the code. However, if there are no branches, then the code can be unrolled by a large degree to avoid the pipeline delays and to fully utilize the multiple functional units. This is the main aim of the invention.

On some RISC machines, a "difference or zero" (DOZ) instruction is provided which can be used to implement the select operation. It is defined as doz(b,a)=(b−a) if a<b, else it is zero. With this definition, c=max(a,b) and d=min(a,b) can be calculated as follows:

$$t=doz(b,a)$$

$$c=a+t$$

$$d=b-t$$

Figure 2:
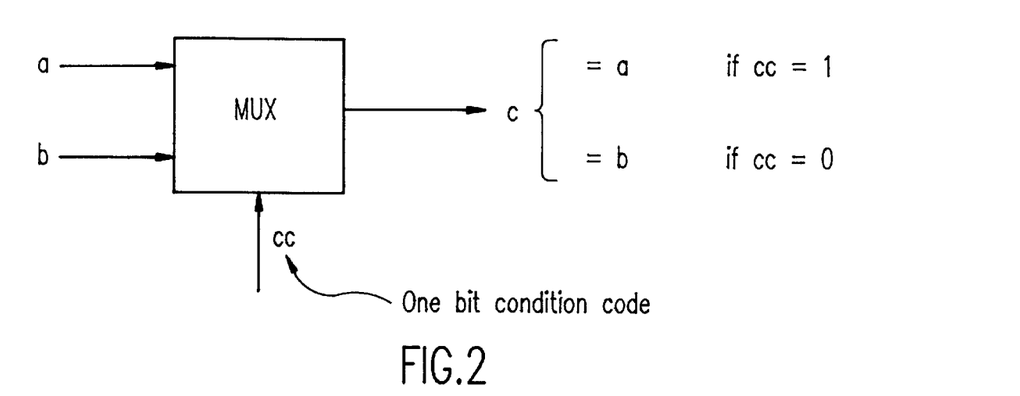
FIG. 2 is a block diagram of the select function according to the invention.

The select instruction helps in eliminating the branches. However, this is not general enough to work in all situations. Now, the concept of evaluating expressions with condition code will be described. With this more powerful concept, a large number of computing kernels encountered in sorting and searching can be implemented. The select function is illustrated in FIG. 2 by a multiplexer having as inputs a and b which are arbitrary integers or floating point values. A one bit condition code, cc, selects one of the inputs, a or b, and provides an output c. For example, the output c=a if cc=1, but the output c=b if cc=0.

Conditional Arithmetic Instructions

As an example, consider conditional addition of two numbers a and b carried out under condition codes ca and cb.

$$c=csum(ca,a,cb,b)$$

$$c=ca \cdot a + cb \cdot b$$

In the above expression, if ca=1, then ca·a=a; otherwise, it is zero. A similar definition applies to cb·b. It is fairly easy to implement this instruction. It is very similar to an ordinary sum instruction except that the operands are gated by condition code bits. This additional gate delay should not have a significant impact on the processor cycle time. Similarly, other arithmetic instructions can be defined where operands are gated by condition codes. Sometimes, it is desirable to gate an operand on the inverse (negation or NOT) of a condition code. Thus, it is useful to associate one more bits with each condition code field in the conditional arithmetic instruction above. This bit or bits will decide if the condition code or its inverse is to be used for gating the operand. The select function defined above can be implemented using condition arithmetic as shown below.

$$c=\text{select }(cc,a,b)=csum(cc,a,\overline{cc},b) cc \cdot a + \overline{cc} \cdot b$$

In the expression above, if cc=1, then c=a, else c=b. Thus, conditional arithmetic instructions are more general. However, their implementation requires more operand bits. It requires two condition code bit fields, and each condition code operand requires another bit to select the condition code or its inverse.

Conditional arithmetic instructions also can be defined where only one of the operands is gated by a condition code. For example, c=a+c·b. In this addition, the operand b is gated by the condition code cc.

Figure 3A:
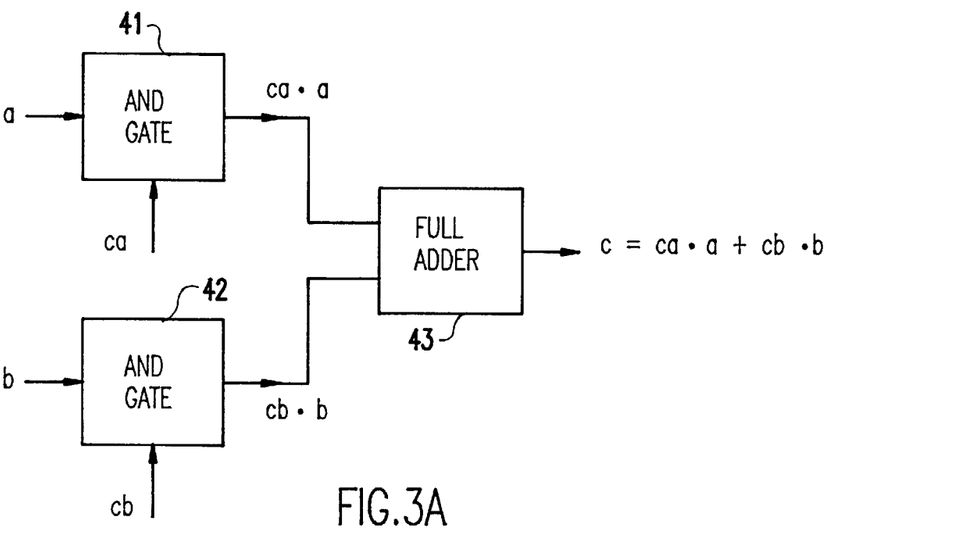
FIGS. 3A and 3B are block diagrams of implementations of conditional arithmetic instructions according to the invention.
Figure 3B:
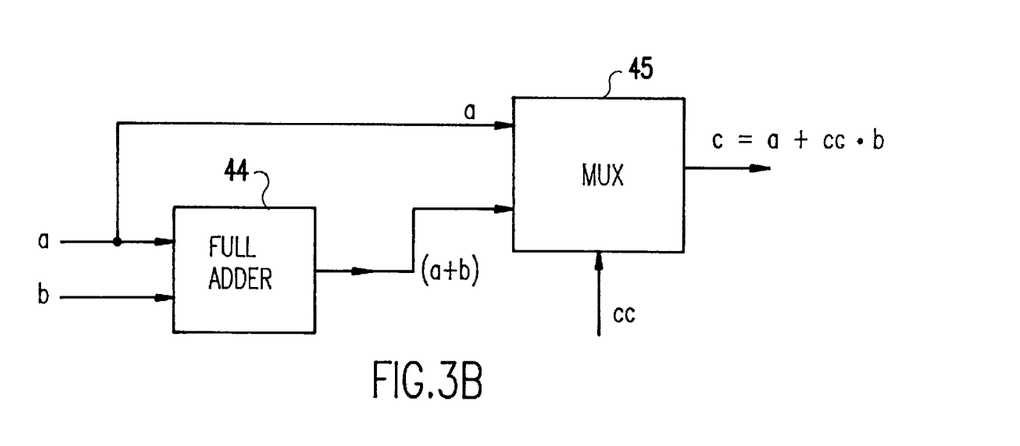

FIGS. 3A and 3B illustrate implementations of arithmetic with condition codes. In FIG. 3A, ca and cb are one-bit condition codes, and a and b are either integers or floating point values. The output of AND gate 41 is ca·a, and the output of AND gate 42 is cb·b. These outputs are input to full adder 43 which generates the output c=ca·a+cb·b. The implementation in FIG. 3B uses a single one-bit condition code, cc. In this implementation, both a and b are input to full adder 44 which outputs a+b to one input of multiplexer 45. The other input to multiplexer 45 is a, and the condition code, cc, is used to select the output as c=a+cc·b.

Quick Sort

Quick sort is a very important sort kernel. In one step of quick sort, an array of size N is divided into two arrays such that all elements in one array are larger than all elements in the other array. This is done in place. By recursively iterating on the algorithm, in about log(N) steps, the entire array can be sorted. This is described on page 114 of *The Art of Computer Programming, Vol. 3, Sorting and Searching,* by D. E. Knuth, Addison-Wesley (1973). Consider one step of this algorithm where an array of size N is divided into two arrays. The following paragraph is reproduced from Knuth, supra:

"Consider therefore the following comparison/exchange scheme: Keep two pointers i and j, with i=1 and j=N initially. Compare K(i):K(j), and if no exchange is necessary decrease j by one and repeat the process. After an exchange first occurs, increase i by one, and continue comparing and increasing i until another exchange occurs. Then decrease j again, and so on, 'burning the candle at both ends', until i=j."

With some refinements, this can be coded in Fortran as shown below.

```
i=1
j=N
kk=K(1)
if(i.eq.j) goto 30
kkk=K(j)
if (kkk.ge.kk) then
    j=j-1
    goto 10
endif
K(i)=kkk
i=i+1
if (i.eq.j) goto 30
kkk=K(i)
if (kk.ge.kkk) then
    i=i+1
    goto 20
endif
K(j)=kkk
j=j-1
goto 10
K(i)=kk
return
```

At the end of this computation (K(i)=K(j)=original K(1)), all elements below K(i) are less than or equal to K(i) and all elements above K(i) are greater than or equal to K(i).

Clearly, because of various branches, the above code will not be very efficient on modern high performance pipelined machines with multiple execution units. This code can be implemented without any branches using the conditional arithmetic and select instructions defined above. For clarity, all expressions are expressed in their full form. It will be the job of the compiler to appropriately translate these expressions into the machine instructions of the given machine. As used herein, a variable of type condition code has two values (0 and 1), and an inversion, $\overline{cc}$, of the condition code, cc, flips its value. In an expression (cc·a) , cc=1, cc·a=a else it is zero.

Using this terminology, a quick sort kernel as described above is implemented in the Fortran code given below. This is a new enhanced Fortran which allows for arithmetical operations with binary variables of type condition code.

```
i=1
j=N
kk=K(1)
ij=j
do m=1,N-1
    kkk=K(ij)
    cc=(kkk.ge.kk)
    ij=cc.j+cc.i
    K(ij)=kkk
    j=j-cc.1
    i=i+cc.1
    ij=cc.j+cc.i
enddo
K(i)=kk
return
```

The above code does not have any branch instructions other than the branch on count instruction for the do loop. On most RISC machines, the branch on count instruction executes in zero cycle. In the loop, the array index ij has to be converted into the array address pointer. This requires a shift left logical instruction to account for the fact that each array element takes four bytes of storage in memory. This shift left logical instruction can be avoided if array pointer values are used instead of the index variables i, j and ij. The loop can also be made shorter if the variable jmi=(j−i) is used instead of j. With this change of variable, the loop can be simplified as shown below.

```
i=1
kk=K(1)
cc=1
do jmi=N-1,1,-1
    ij=i+cc.jmi
    kkk=K(ij)
    cc=(kkk.ge.kk)
    ij=i+cc.jmi
    K(ij)=kkk
    i=i+cc.1
enddo
K(i)=kk
return
```

The loop in the above code requires one less instruction. Also, in this implementation, in conditional arithmetic instructions, only one operand is gated by a condition code. Thus, the simpler form of conditional arithmetic instructions (having only one condition code field) can be used. The above code does in place sorting. If this requirement were relaxed and a different array were used for output, then the code can be further simplified. Let K1 be the input array and K2 be the output array. Then the quick sort can be implemented as shown below.

```
            i=1
            kk=K1(1)
            do jmi=N-1,1,-1
                kkk=K1(N-jmi+1)
                cc=(kkk.ge.kk)
                ij=i+cc.jmi
                K2(ij)=kkk
                i=i+cc.1
            enddo
            K2(i)=kk
            return
```

In this case, the input array K1 is sequentially accessed with stride one. This implementation requires one less instruction compared to the preceding implementation.

In the beginning, it was asserted that by removing the branches, the loop could be unrolled, making it possible to utilize multiple functional units. Now, this will be demonstrated. Assume that the input array K is of size 4×N and it is desired to partition the array based on the value of its first element (K(1)). The output consists of four arrays K1, K2, K3, and K4, each of length N. The first element of the input array is mapped to K1, the second element is mapped to K2, and so on in a cyclic fashion. At the end of sorting, indices i1, i2, i3, and i4 are produced such that all elements in K1 below index i1 are less than or equal to K(1), and all elements in K1 above (and including) index i are greater than or equal to K(1). Similar statements can be made for the other arrays. The code to implement this unrolled version of quick sort is given below.

```
            i1=1
            i2=1
            i3=I
            i4=1
            kk=K(1)
            ii=1
            do jmi=N-1,0,-1
                kkk1=K(ii)
                kkk2=K(ii+1)
                kkk3=K(ii+2)
                kkk4=K(ii+3)
                ii=ii+4
                cc1=(kkk1.ge.kk)
                cc2=(kkk2.ge.kk)
                cc3=(kkk3.ge.kk)
                cc4=(kkk4.ge.kk)
                ij1=i1+cc1.jmi
                ij2=i2+cc2.jmi
                ij3=i3+cc3.jmi
                ij4=i4+cc4.jmi
                K1(ij1)=kkk1
                K2(ij2)=kkk2
                K3(ij3)=kkk3
                K4(ij4)=kkk4
                i1=i1+cc1.1
                i2=i2+cc2.1
                i3=i3+cc3.1
                i4=i4+cc4.1
            enddo
            return
```

On a machine having four functional units, the above unrolled code could execute a factor of four faster. The output arrays generated are not contiguous. If desired, the four arrays can be copied into a single array of size 4×N.

Figure 4:
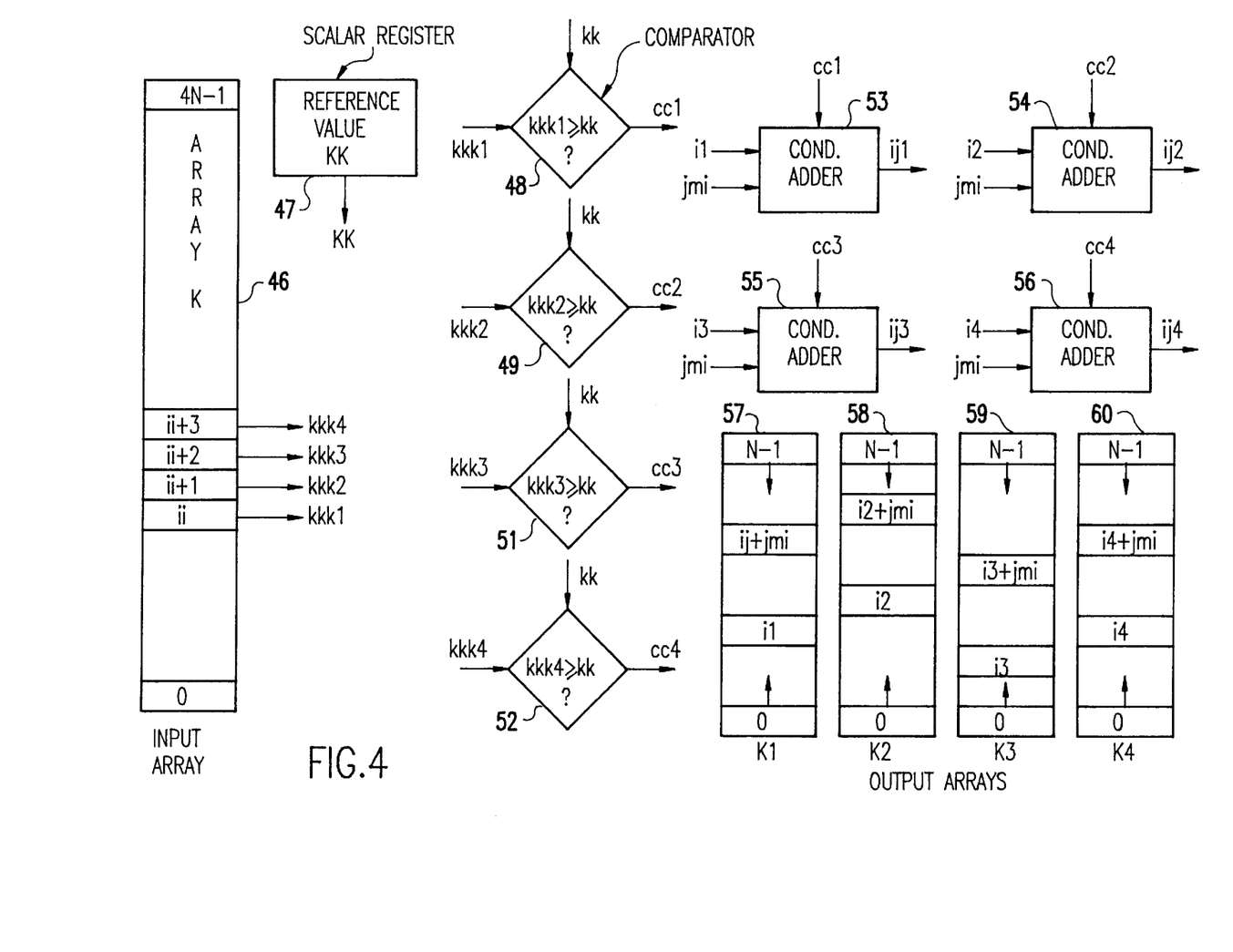
FIG. 4 is a block diagram of the quick sort function according to the invention.

The foregoing is illustrated in FIG. 4 which shows an input array 46 and a scalar register 47 providing inputs to four independent comparators 48, 49, 51, and 52. More specifically, a reference value KK from register 47 is input to each of the comparators 48, 49, 51, and 52, and values kkk1, kkk2, kkk3, and kkk4 from array 46 are respectively input to comparators 48, 49, 51, and 52. The outputs of these comparators, cc1, cc2, cc3, and cc3, respectively, are used to control conditional adders 53, 54, 55, and 56. Adder 53 receives as inputs i1 and jmi and outputs ij1 to output array 57. Adder 54 receives as inputs i2 and jmi and outputs ij2 to output array 58. Adder 55 receives as inputs i3 and jmi and outputs ij3 to output array 59. Adder 56 receives as inputs i4 and jmi and outputs ij4 to output array 60. The adders 53, 54, 55, and 56 are also used to update i1, i2, i3, and i4. The structure shown in FIG. 4 shows parallelism and no conditional branches.

Merge Sort

Merge sort is another important sort kernel. In merge sort, two sorted arrays are merged to produce a single sorted array. It is described on pages 159–163 of Knuth, supra. Let K1 be a sorted array of size N1. It is sorted in ascending order; i.e., K1(i)<K1(j) for 0<i<j<N1+1. Similarly, K2 is a sorted array of size N2. These two arrays have to be merged to produce a single sorted array K of size N=(N1+N2). It is useful to append an infinite valued element to the end of both arrays. Now, merge sort can be implemented using conditional arithmetic as shown below.

```
            i=1
            j=1
            do m=1,N
                kk=K1(i)
                kkk=K2(j)
                cc=(kkk.ge.kk)
                K(m)=cc.kk+cc.kkk
                i=i+cc.1
                j=j+cc.1
            enddo
            return
```

In the merge sort algorithm, multiple functional units can be utilized if multiple independent merges can be done at the same time. Using a binary search algorithm on K1 and K2 arrays, the median value can be located for the K array. Then each of the two arrays K1 and K2 can be split around the median of K resulting in subarrays K11, K12, K21, and K22 having elements N11, N12, N21, and N22 with the property (N11+N21)=(N12+N22)=N/2. These binary search procedures should take of the order of Log(N) steps. For large values of N, this part of the algorithm should be insignificant compared to the rest of the computation. Now arrays K11 and K21 can be merged together to produce the bottom half of the K array and K12 and K22 can be merged together to produce the top half of the K array. This results in two independent merges and thus two functional units can be utilized simultaneously. The code to implement this is given below.

```
            i1=1
            i2=1
            j1=1
            j2=1
            do m=1,N/2
                kk1=K11(i1)
                kk2=K12(i2)
                kkk1=K21(j1)
                kkk2=K22(j2)
                cc1=(kkk1.ge.kk1)
                cc2=(kkk2.ge.kk2)
                K(m)=cc1.kk1+cc1.kkk1
                K(m+N/2)=cc2.kk2+cc2.kkk2
                i1=i1+cc1.1
```

```
        i2=i2+cc2.1
        j1=j1+cc1.1
        j2=j2+cc2.1
    enddo
    return
```

Figure 5:
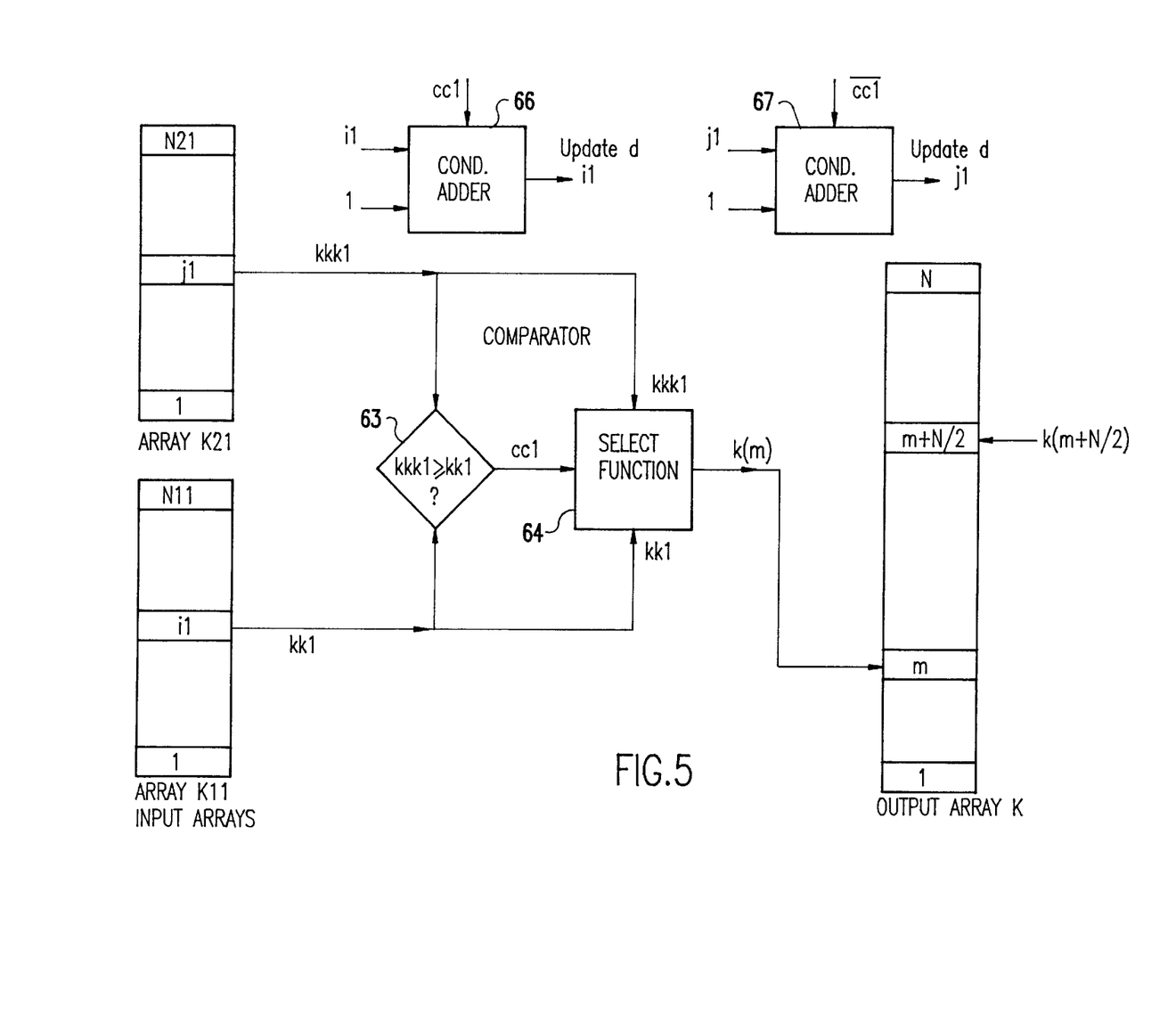
FIG. 5 is a block diagram of the merge sort function according to the invention.

FIG. 5 shows an implementation of the merge sort function. FIG. 5 shows only half the hardware of the implementation, the remaining half being substantially identical to that which is shown. In FIG. 5, two input arrays K11 and K21 provide respective outputs kk1 and kkk1 to a comparator 63 and a select function (e.g., a multiplexer) 64. Comparator 63 determines if kkk1 is greater than or equal to kk1 and generates a control code cc1 which controls the select function 64 to select one of kkk1 and kk1 as the output K(m) of the output array K. The equivalent additional hardware (not shown) processes an element from the input arrays K12 and K22 to produce the element K(m+N/2) of the output array in parallel with the hardware shown in FIG. 5. The control code cc1 and its inverse $\overline{cc1}$ are used in conditional adders 66 and 67 to update i1 and ji, which are input to input arrays 61 and 62.

Multi-Way Merges

In the section entitled "Merge Sort", a discussion was presented on how to merge two sorted key arrays into a single array. In general, using such algorithms, sorting an array of size n requires approximately log2(n) passes through the data. On modern high performance processors, memory access becomes a bottleneck, it is highly desirable to minimize the number of passes through cache. One way to do this is to merge multiple lists simultaneously. Assume that $p=2^m$ lists are to be merged into a single list. Then a standard two-way merge algorithm will require m passes through the memory system. However, if they can be merged simultaneously, then only one pass through the memory system is needed. The algorithms to do this are fairly well known. In many ways, these algorithms are duals of the hashing algorithm discussed above. In hashing, a single list is split into p lists. In a multi-way merge, p lists are merged into a single list. Again, this can be done without any branches.

Figure 6:
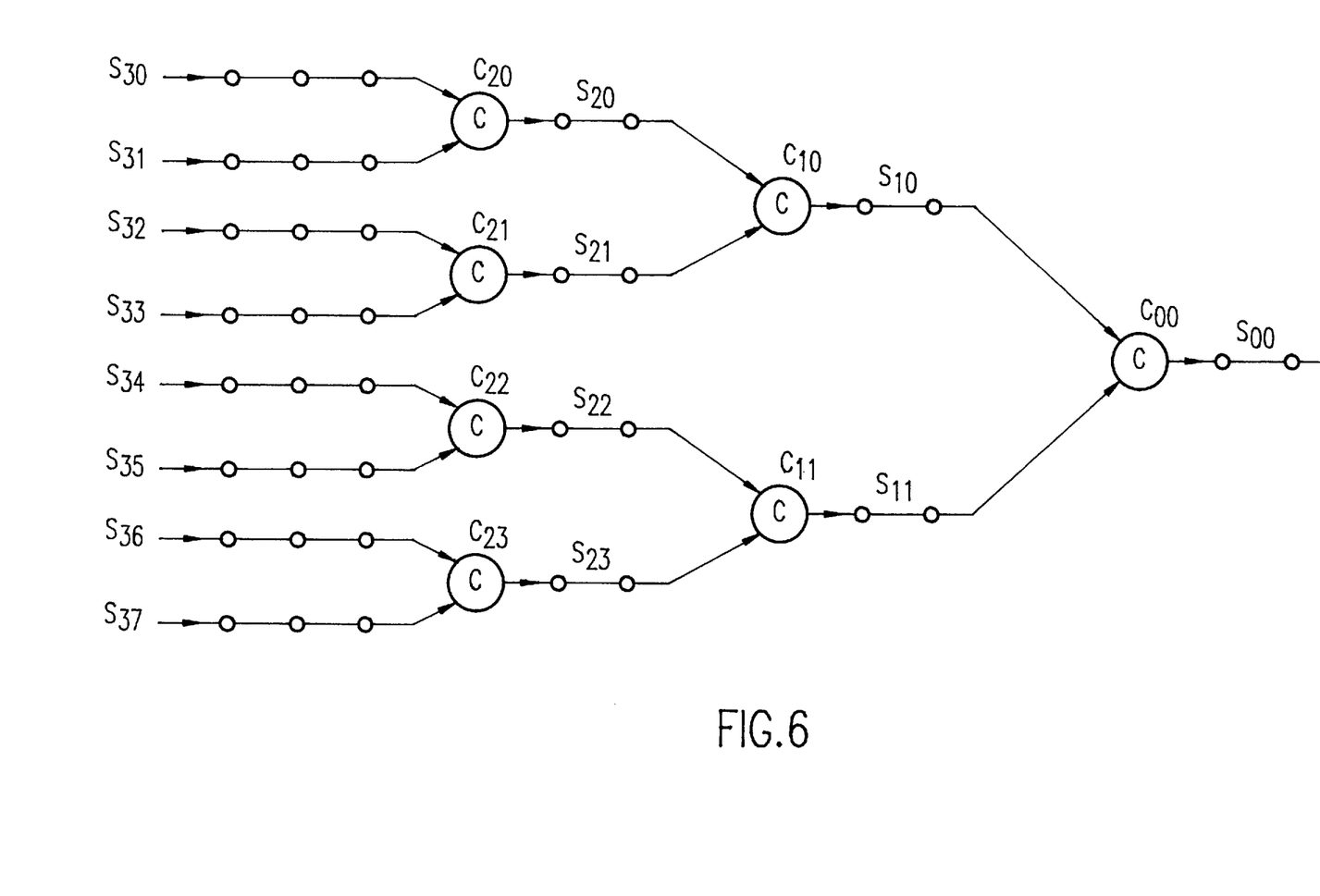
FIG. 6 is a schematic diagram illustrating an eight-way merge.

FIG. 6 shows in schematic form an eight-way merge. The eight sorted key streams to be merged are labels S30 through S37. These eight steams are merged pair-wise using comparators C20 through C23 to produce four streams S20 through S23. These four streams are again merged pair-wise to produce streams S10 and S11, which in turn are again merged to produce the final sorted stream S00. The important point about the scheme shown in FIG. 6 is that at any given time, all intermediate streams are of a fixed length, typically one or two. These streams move only when a hole (vacancy is created by advancing the lead key to the next stream (as a result of the comparator outcome). It is best to visualize the processing if it is viewed from the output side. The comparator C00 compares the lead keys of streams S10 and S11 to produce the next key of stream S00. As a result of this, one of the two streams (S10 or S11) will have a hole or bubble. This is propagated backward to the beginning of that stream. This activates the corresponding comparator (C10 or C11). The lead keys behind this comparator are compared and the outcome fills the hole. This in turn creates a bubble in one of the four level two streams (S20 through S23). This chain reaction is propagated backward all the way to the original streams to be merged together. Only one of the original streams will have a bubble and thus will advance by one position. This processing continues until all the streams are merged. it is again useful to put a few infinite valued keys at the end of each stream. The entire process is driven by the output stream and is a dual of the hashing scheme. In one time step, the output stream moves by one position and this creates a bubble which ultimately moves to one of the p input streams.

This also suggests the possibility of parallel processing, using multiple functional units. This processing is represented by a tree having log2(p) levels. The output is the root of this tree (level zero) and the inputs are the p branches (level log2(p)). Assume that it takes one time step for the bubble to move through one level of the tree. Then, log2(p) functional units can be efficiently utilized. While a comparator at level one of the tree is processing the current bubble, the comparator assigned to level two of the tree is working on the bubble from the previous time step, and so on. There is one functional unit assigned to each level of the tree. In any given time step, there is exactly one bubble at each level of the tree being processed by the functional unit assigned to that level.

The multi-way merge processing described here can be implemented without any branches. The position of a bubble (index of the stream) at tree level j is related to the position of that bubble at tree level (j−1) and the output of the corresponding comparator. Let index (j−1) be the index of the stream at level (j−1) and cc(j−1) be the output of the comparator at level (j−1), then the index of the stream at level j is given by $$\text{index}(j) = 2 \times \text{index}(j-1)cc(j-1), j=1, \ldots, \log2(p)$$

The above equation describes the movement of the bubble from its root (j=0, index(0)=0) to its leaves (j=log2(p)).

Figure 7:
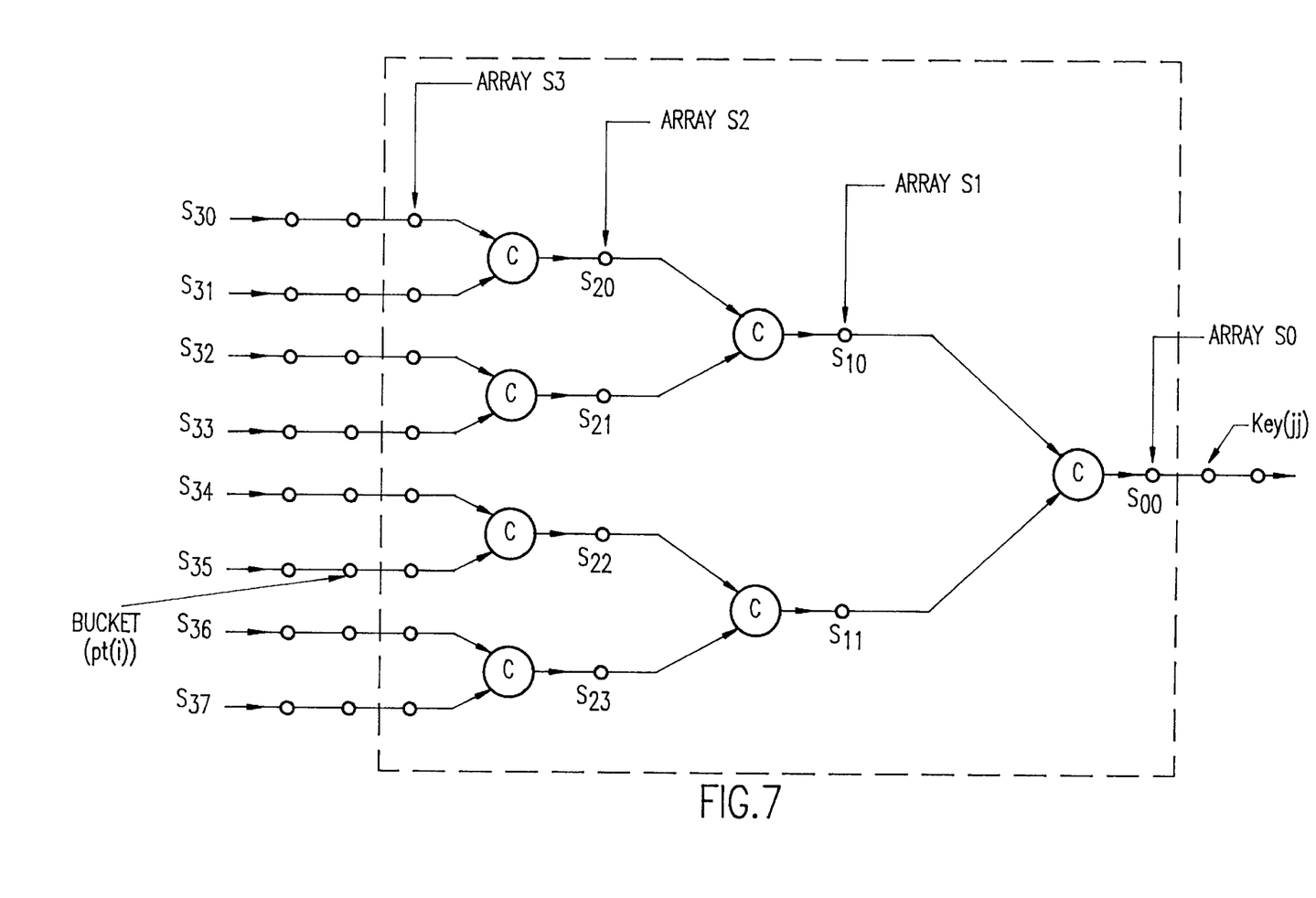
FIG. 7 is a schematic diagram illustrating the eight-way merge of FIG. 6 and showing the pointers associated with each data stream and all intermediate streams are of length one.

There will now be presented various Fortran implementations of the multi-way merge algorithm described above, without any branches. The first implementation assumes a single functional unit. This implementation is illustrated in FIG. 7. This implementation is almost a dual of the Fortran implementation first described in the section in hashing, with all computing steps done in the reverse order. The sorted output array is represented as the key array of size n. All input streams come from a single array called bucket. There is a pointer associated with each stream. These pointers are represented by a pointer array pt of size p. In this implementation, p=8. Thus, at any time, bucket (pt(i)) represents the key next to the lead key in the i-th input stream. The intermediate streams are designated as arrays of size $2^j$, for the j-th level of the tree. Thus, S0 array of size one (actually a scalar) represents the output of C00, and array S1 of size two is used to represent S10 and S11. Note that all intermediate streams are of size one. S2, an array of size four, represents streams S20 through S23. S3, an array of size eight, represents the lead keys of streams S30 through S33. Thus, a total of fifteen intermediate values are declared. This equals 2×p−1. Here, the intermediate values are declared as four different arrays of different sizes. But it is possible to represent all these values as a single array of size 2×p−1. On the other hand, the hash table could also be represented as multiple arrays of different sizes, one array for each level of the tree. These two representations are very similar. The code for this eight-way merge is given below. Again, the set up code before the do loop has been omitted. This code merges the eight key streams which are sorted in the ascending order. Also, 0 and 1 are used as the possible values for the condition codes.

```
do jj=1,n
    key(jj)=s0
    cc=(s1(0).gt.s1(1))
    i1=cc.1
    s0=s1(i1)
    cc=(s2(2xi1).gt.s2(2xi1+1))
    i2=2xi1+cc.1
    s1(i1)=s2(i2)
    cc=(s3(sxi2).gt.s3(2xi2+1))
    i3=2xi1+cc.1
    s2(i2)=s3(i3)
    s3(i3)=bucket(pt(i3))
    pt(i3)=pt(i3)+1
enddo
```

Figure 8:
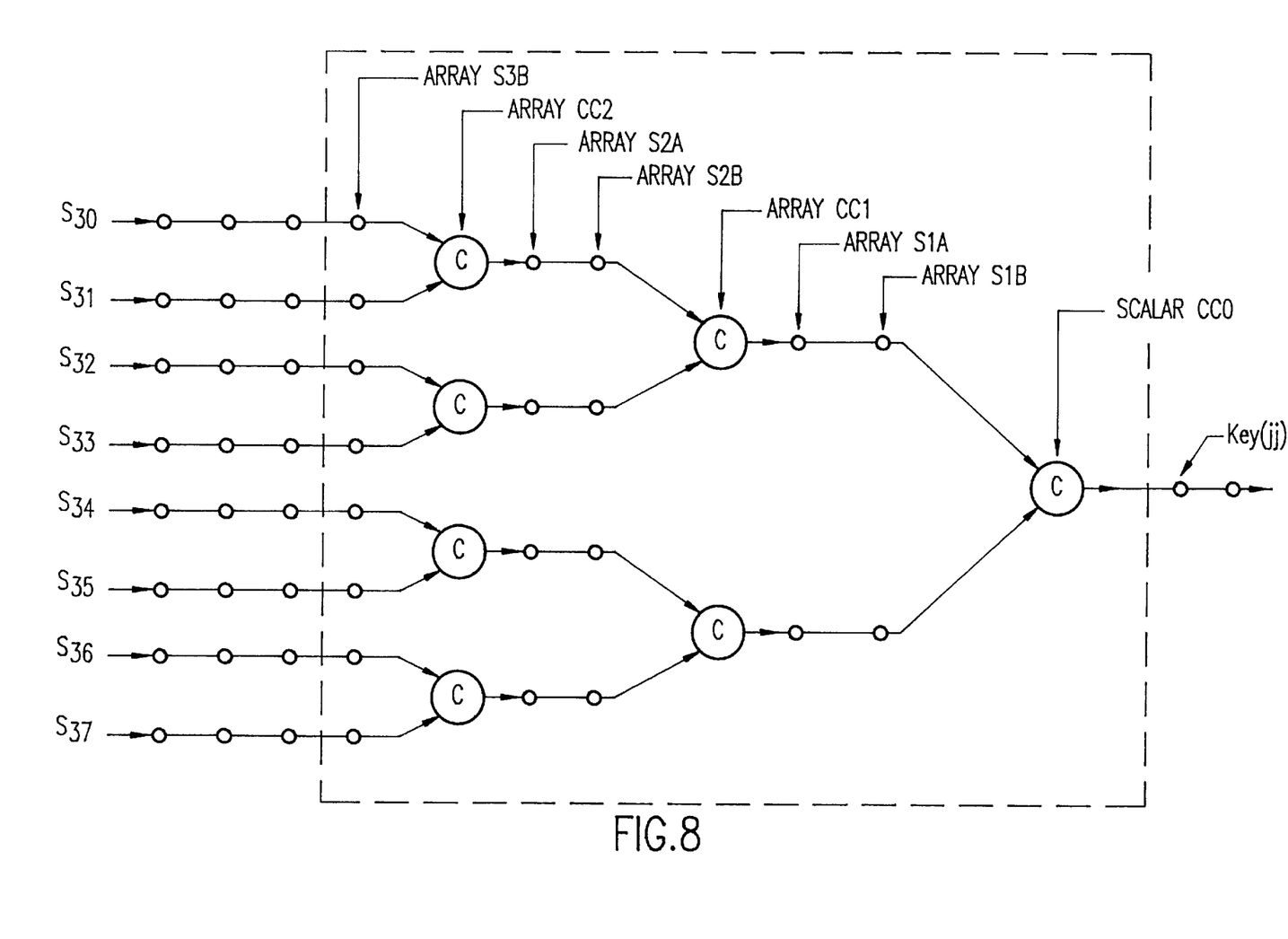
FIG. 8 is a schematic diagram illustrating the eight-way merge of FIGS. 6 and 7 modified so that all intermediate streams are of length two to exploit the parallelism of the processor.

The code above is essentially a sequential code. This is because all the compares are done on demand. If these compares can be done in advance, then multiple functional units can be exploited. We declare condition code arrays of size $2^j$ for all levels of the tree from j=0 to log2p−1. Thus, ccj(i) represents the outcome of the comparison of sjp1(2×i) with sjp1(2×i+1), where sjp1 represents the key array at level j+1. In FIG. 8, all intermediate streams are of length one. They need to be at least of length two to exploit parallelism. With these changes, the scheme is shown in FIG. 8. At each level of the tree, there are two sets of S arrays. They have suffixes a and b. This scheme can utilize log2(p) function units at the same time. This processing will be described as processing to be done in one time step of the algorithm. At the beginning of a time step, at j-th level of the tree, exactly one element in the corresponding sja array has a hole and none of the sjb array have a hole. Also, at the beginning of a time step, all the cc arrays have settled and reflect the outcome of the comparison of the two elements in the s$b arrays of the next higher level of the tree. Now, the processing during one time step at one of the middle levels of the tree will be described. First, the cc array values are used to transfer an element from the s$b array of the next higher level to the hole in the s$a array of this level. This creates exactly one hole in the s$b arrays at all levels. To fill these holes, the corresponding elements from s$a arrays are transferred to the s$b array at the same level. Now, these newly arrived elements are compared against their partners to set the condition code which will be utilized in the next time step of the algorithm. This completes the processing of a time step at one of the middle levels of the tree. There are some minor differences at the zero-th level (output array) and at the leaves (input array). These differences are quite obvious from FIG. 8. The code for this scheme is given below.

```
do jj=1,n
    i1n=cc0.1
    i2n=2xi1+cc1(i1).1
    i3n=2xi2+cc2(i2).1
    key(jj)=s1b(i1n)
    s1a(i1)=s2b(i2n)
    s2a(i2)=s3b(i3n)
    s1b(i1n)=s1a(i1n)
    s2b(i2n)=s2a(i2n)
    s3b(i3n)=bucket(pt(i3n))
    cc0=(s1b(0).gt.s1b(1))
    cc1(i1)=(s2b(2xi1).gt.s2b(2xi1+1))
    cc2(i2)=(s3b(2xi2).gt.s3b(2xi2+1))
    i1=i1n
    i2=i2n
    pt(i3n)=pt(i3n)+1
enddo
```

If this code is unrolled by two, then assignment statements for i1 and i2 can be eliminated. This code clearly shows the potential to exploit a large number of functional units. If 256 streams are being merged, the eight functional units can be utilized. All the intermediate arrays will remain in cache. The data streams are accessed with stride one and thus they can be prefetched into cache. The amount of computing done for each memory access (key value) is large. Thus, it should be possible to realize a very high level of performance for database type of codes on VLIW processors.

While the invention has been described in terms of several preferred embodiments, those skilled in the art will recognize that the invention can be practiced with modification within the spirit and scope of the appended claims.

Having thus described my invention, what I claim as new and desire to secure by Letters Patent is as follows:

1. A computer implemented method performed by a processor having multiple functional units, comprising the steps of:

identifying at least one branch operation in a code to be performed by said processor, said branch operation having an IF(FUNCTION(OPERAND)) -THEN-OPERATION form;

substituting for said identified branch operation a plurality of arithmetic instructions, said plurality of arithmetic instructions substantially devoid of said IF(FUNCTION(OPERAND)) -THEN-OPERATION branch operation, said plurality comprising arithmetic instructions for calculating condition codes based on comparative values of said OPERANDS of said identified branch operation, and comprising arithmetic instructions incorporating said condition codes, said condition codes logically operating on other operands in said arithmetic instructions, wherein said plurality of instructions is substantially devoid of instructions calculating a difference in value between executing according to a first and a second branch of said branch operation to eliminate a conditional execution of said code and thereby enable a parallel execution of said substituted arithmetic instructions;

decoding said plurality of arithmetic instructions and dispatching decoded instructions representing said substitute code to said plurality of functional units for parallel processing; and executing said plurality of dispatched decoded instructions in parallel using each of the functional units of said processor, thereby fully exploiting the multiple functional units of the processor through instruction level parallelism.

2. The computer implemented method recited in claim 1 wherein the step of executing said plurality of dispatched decoded instructions executes a logical operation of said condition codes and operands in said plurality of arithmetic instructions with a select function which, on the basis of said condition code, selects from two operands.

3. The computer implemented method recited in claim 2 wherein the select function comprises the steps of:

receiving first and second operands;

selecting one of said first and second operands depending on the generated condition code.

4. The computer implemented method recited in claim 3 wherein the step of selecting one of said first and second operands is performed by a conditional valued addition of two numbers representing said first and second operands having an output value further conditional on at least one of said condition codes.

5. The computer implemented method as recited in claim 1 wherein the code is a quick sort code.

6. The computer implemented method as recited in claim 1 wherein the code is a merge sort code.

7. The computer implemented method as recited in claim 1 wherein the code is a multi-way merge code.

8. A computer system which exploits arithmetic instructions with condition codes to eliminate dependencies in a code and thereby enable a parallel execution, comprising:

a processor having a plurality of functional units which can independently execute instructions in parallel;

mean for identifying at least one branch operations in a code to be performed by said processor said branch operation having an IF(FUNCTION(OPERAND))-THEN-OPERATION form;

means for substituting for said identified branch operation a plurality of arithmetic instructions, said plurality substantially devoid of IF(FUNCTION(OPERAND))-THEN-OPERATION branch operations and comprising arithmetic instructions for calculating condition codes based on comparative values of said OPERANDS and comprising arithmetic instructions incorporating said condition codes, said condition codes logically operating on other operands in said arithmetic instructions, wherein said plurality of instructions is substantially devoid of instructions calculating a difference in value between executing according to a first branch and a second branch of said branch operation to eliminate a conditional execution of said code and thereby enable a parallel execution of said substituted arithmetic instructions;

means for decoding said plurality of arithmetic instructions and dispatching decoded instructions representing said substitute code to said plurality of functional units in one processor cycle, wherein said plurality of functional units execute said dispatched instructions in parallel with one another, thereby fully exploiting the plurality of functional units of the processor through instruction level parallelism.

9. The computer system recited in claim 8 wherein the plurality of functional units includes a comparator means for calculating said conditional codes based on a first and a second operand and wherein at least one of the plurality of arithmetic instructions is implemented by a select means which, on the basis of the comparator result selects from a first and a second operand.

10. The computer system recited in claim 9 wherein the select function is performed by a multiplexer receiving the first and the second operand and at least one of said condition codes, said multiplexer selecting one of said first and second operands depending on said at least one condition code.

11. The computer system recited in claim 10 wherein the selection function is performed by a conditional output adder which adds two numbers representing said first and second operands and outputs a value further conditional on said at least one condition code.

12. The computer system recited in claim 11 wherein the conditional adder comprises:

a first AND gate receiving the first operand and enabled by a first condition code;

a second AND gate receiving the second operand and enabled by a second condition code; and a full adder connected to outputs of said first and second AND gate and generating a sum output.

13. The computer system recited in claim 11 wherein the conditional output adder comprises:

a full adder receiving said first and second operands and generating a sum output; and a multiplexer receiving as a first input said first operand and as a second input the sum output of said full adder and responsive to said condition code for selecting one of said first and second inputs.

14. The computer system recited in claim 8 wherein the code is quick sort code, said computer system further comprising:

an input array which receives an address and, in response, outputs a plurality of values equal in number to the number of functional units of said processor;

a plurality of output arrays for receiving results of a quick sort, wherein said plurality of functional units of said processor implement a corresponding plurality of comparators receiving a scale reference value and a corresponding one of the values output by the input array and generate a plurality of condition codes, wherein said plurality of functional units perform arithmetic operations having outputs dependent on the condition codes, and wherein results based on said functional units' outputs are output to to said plurality of output arrays.

15. The computer system recited in claim 8 wherein sorting code is a merge sort code, said computer system further comprising:

a plurality of input arrays which receive an address and, in response, output a plurality of values equal in number to the number of functional units of said processor;

an output array output arrays for receiving results of a quick sort, wherein said plurality of functional units of said processor implement a corresponding plurality of comparators receiving a scale reference value and a corresponding one of the values output by the input array and generate a plurality of condition codes, wherein said plurality of functional units perform arithmetic operations having outputs dependent on the condition codes, and wherein results based on said functional units' outputs are output to said output array.

* * * * *